United States Patent
Kuromizu et al.

(10) Patent No.: US 8,355,092 B2
(45) Date of Patent: Jan. 15, 2013

(54) OPTICAL MEMBER, ILLUMINATING DEVICE USING THE SAME, DISPLAY DEVICE, AND TELEVISION RECEIVING DEVICE

(75) Inventors: Yasumori Kuromizu, Osaka (JP); Hirokazu Mouri, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 595 days.

(21) Appl. No.: 12/599,851

(22) PCT Filed: Jan. 31, 2008

(86) PCT No.: PCT/JP2008/051522
§ 371 (c)(1),
(2), (4) Date: Nov. 12, 2009

(87) PCT Pub. No.: WO2008/142877
PCT Pub. Date: Nov. 27, 2008

(65) Prior Publication Data
US 2010/0214491 A1    Aug. 26, 2010

(30) Foreign Application Priority Data
May 22, 2007    (JP) .................................. 2007-135049

(51) Int. Cl.
*G02F 1/1335* (2006.01)
(52) U.S. Cl. ................ 349/57; 349/61; 349/62
(58) Field of Classification Search .................. 349/95, 349/57, 61–62, 64–65
See application file for complete search history.

(56) References Cited

U.S. PATENT DOCUMENTS

| | | | |
|---|---|---|---|
| 5,808,784 A | 9/1998 | Ando et al. | |
| 5,841,572 A | 11/1998 | Ando et al. | |
| 5,851,062 A * | 12/1998 | Shinohara et al. | 362/620 |
| 5,852,512 A * | 12/1998 | Chikazawa | 359/463 |
| 2003/0086030 A1* | 5/2003 | Taniguchi et al. | 349/61 |
| 2004/0114372 A1* | 6/2004 | Han et al. | 362/330 |
| 2007/0002585 A1* | 1/2007 | Lee et al. | 362/607 |

(Continued)

FOREIGN PATENT DOCUMENTS
EP    1 900 966 A1    3/2008
(Continued)

OTHER PUBLICATIONS
International Search Report for PCT/JP2008/051522, mailed Apr. 22, 2008.

*Primary Examiner* — Edward Glick
*Assistant Examiner* — Anthony G. Quash
(74) *Attorney, Agent, or Firm* — Nixon & Vanderhye, PC

(57) ABSTRACT

An optical member comprises a diffusion layer (13) diffusing emitted light from light sources (12), a first light collection layer (15), in which first projecting portions (15a) extending in a Y-direction are arranged at intervals (T1), refracting and collecting incident light from the diffusion layer (13), a first reflection layer (14) having first reflective portions (14a) facing boundaries between the adjacent first projecting portions (15a) and reflecting emitted light from the diffusion layer (13), a second light collection layer (17), in which second projecting portions (17a) extending in an X-direction are arranged at intervals (T2), refracting and collecting incident light from the first light collection layer (15), and a second reflection layer (16) having second reflective portions (16a) facing boundaries between the adjacent second projecting portions (17a) and reflecting emitted light from the first light collection layer (15).

14 Claims, 3 Drawing Sheets

U.S. PATENT DOCUMENTS

| | | |
|---|---|---|
| 2007/0014034 A1 | 1/2007 | Lee et al. |
| 2008/0204625 A1* | 8/2008 | Lee .................................. 349/58 |
| 2009/0225538 A1 | 9/2009 | Horikoshi et al. |
| 2009/0284954 A1 | 11/2009 | Yamada et al. |
| 2010/0149225 A1 | 6/2010 | Kamada |

FOREIGN PATENT DOCUMENTS

| | | | |
|---|---|---|---|
| JP | 08-075928 | | 3/1996 |
| JP | 2000-284268 | | 10/2000 |
| JP | 2006-208930 | * | 8/2006 |
| JP | 2007-025619 | | 2/2007 |
| JP | 2007-033962 | | 2/2007 |
| JP | 2007-041172 | * | 2/2007 |
| WO | WO 2007/000962 A1 | | 1/2007 |
| WO | WO 2007/049511 A1 | | 5/2007 |
| WO | WO 2008/123403 A1 | | 10/2008 |

* cited by examiner

VIEW ANGLE(°)

OPTICAL MEMBER, ILLUMINATING DEVICE USING THE SAME, DISPLAY DEVICE, AND TELEVISION RECEIVING DEVICE

This application is the U.S. national phase of International Application No. PCT/JP2008/051522, filed 31 Jan. 2008, which designated the U.S. and claims priority to Japanese Patent Application No. 2007-135049, filed 22 May 2007 the entire contents of each of which are hereby incorporated by reference.

TECHNICAL FIELD

The technology presented herein relates to an optical member, an illuminating device, a display device, and a television receiving device.

BACKGROUND AND SUMMARY

A conventional illuminating device is disclosed in Patent Document 1. This illuminating device is provided with a diffusion plate diffusing light emitted from a light source, and a lens sheet is provided on a light-emission side of the diffusion plate. The lens sheet is a lenticular sheet formed of an array of a plurality of lenticular lenses (barrel-shaped lenses) having cylindrical surfaces.

The diffused light enters the lens sheet to be refracted by the cylindrical surfaces to be collected in a direction substantially perpendicular to the surface of the diffusion plate. In viewing a display panel disposed facing the illuminating device, this makes it possible to secure an ample amount of light emitted from the front surface of the display panel within a predetermined view angle, and to make effective use of light emitted from the light source.

In addition, part of light reaching the cylindrical surface from around a boundary between adjacent lenticular lenses enters the cylindrical surfaces at a large incidence angle to be reflected. This reflected light is emitted from a position facing the position at which the light has been reflected at a large angle with respect to a direction perpendicular to the front surface of a diffusion plate. To prevent this, a reflection sheet is disposed between the diffusion plate and the lens sheet. The reflection sheet has a plurality of reflection portions individually facing the boundaries between adjacent lenticular lenses.

As a result, light approaching boundaries between adjacent lenticular lenses is reflected toward the diffusion plate and then enters the lens sheet from other positions. This makes it possible to reduce the light that would otherwise be vainly emitted from the lens sheet at a large angle with respect to the direction perpendicular to the front surface of the diffusion plate, and thus to make an effective use of light emitted from the light source.

Patent Document 1: JP-A-2006-208930 (Pages 3-10, FIG. 1)

However, according to the above described conventional illuminating device, although light is collected such that the exit angle in the period direction of the lenticular lenses is within a predetermined range, the exit angle in the direction in which the lenticular lenses extend is large. FIG. 5 shows distribution of brightness of light emitted from the illuminating device. The vertical axis indicates the brightness, and the horizontal axis indicates the view angle of the lenticular lenses in the period direction (unit: °, indicated by the solid line A in the figure) and the view angle of the lenticular lenses in the direction in which they extend (unit: °, indicated by the broken line B0 in the figure).

According to the figure, for example, in the right-left direction of the display panel, light is collected within a range of a predetermined view angle, where the light amount becomes large. In the up-down direction of the display panel, however, the light amount does not differ much between in and out of the view angle. Thus, light is uselessly emitted out of the view angle in the up-down direction. Inconveniently, this reduces the light amount at the front surface, preventing fully effective use of light.

A feature of the present technology is to provide an optical member allowing more effective use of light emitted from a light source, and an illuminating device using such an optical member. Another feature of the present technology is to provide a display device and a television receiving device provided with an illuminating device capable of using light emitted from a light source more effectively.

To achieve the above, according to one aspect of the example embodiment presented herein, an optical member is provided with: a diffusion layer diffusing light emitted from a light source; a first light collection layer that is disposed on a light-emission side of the diffusion layer, that has a plurality of first projection portions extending in a direction and arranged with a predetermined period, and that refracts and collects light incident thereon from the light diffusion layer by using the first projection portions; a first reflection layer that has a plurality of first reflection portions so arranged, with a same period as the first projection portions, as to face boundaries between adjacent first projection portions, that is disposed between the diffusion layer and the first light collection layer, and that reflects light emitted from the diffusion layer by using the first reflection portions; a second light collection layer that is disposed on a light-emission side of the first light collection layer, that has a plurality of second projection portions extending in a period direction of the first projection portions and arranged with a predetermined period, and that refracts and collects light incident thereon from the first light collection layer by using the second projection portions; and a second reflection layer that has a plurality of second reflection portions so arranged, with a same period as the second projection portions, as to face boundaries between adjacent second projection portions, that is disposed between the first light collection layer and the second light collection layer, and that reflects light emitted from the first light collection layer by using the second reflection portions.

With this structure, light emitted from the light source enters the diffusion layer to be diffused. Light emitted from the diffusion layer enters the first light collection layer to be collected within a range of predetermined view angle by the plurality of first projection portions. Light emitted from the diffusion layer to travel close to the boundaries between adjacent first projection portions is reflected on the first reflection portions of the first reflection layer to return to the diffusion-layer side, and enters the first light collection layer from different positions. Light emitted from the first light collection layer enters the second light collection layer to be collected within a range of a view angle perpendicular to the first light collection layer. Light emitted from the first light collection layer to travel close to boundaries between adjacent second projection portions is reflected on the second reflection portions of the second reflection layer to return to the diffusion-layer side, and enters the second light collection layer from different positions.

According to the present embodiment, in the optical member structured as described above, it is preferable that a width of each of the second reflection portions in a period direction be smaller than a width of each of the first reflection portion in a period direction.

According to the present embodiment, in the optical member structured as described above, it is preferable that an axis extending in a direction in which the first projection portions extend and an axis extending in a direction in which the second projection portions extend form an angle of 90°±1°.

According to the present embodiment, in the optical member structured as described above, it is preferable that the first reflection layer, the first light collection layer, the second reflection layer, and the second light collection layer be adhered to the diffusion layer formed in a plate shape.

According to the present embodiment, in the optical member structured as described above, it is preferable that the first and second projection portions be lenticular lenses.

According to the present embodiment, in the optical member structured as described above, it is preferable that the first and second projection portions be prisms.

According to the present embodiment, in the optical member structured as described above, it is preferable that the first projection portions be lenticular lenses and the second projection portions be prisms.

According to the present embodiment, in the optical member structured as described above, it is preferable that the first projection portions be prisms and the second projection portions be lenticular lenses.

According to the present embodiment, in the optical member structured as described above, it is preferable that diffusion particles be dispersedly contained in a base material of the diffusion layer.

According to the present embodiment, in the optical member structured as described above, it is preferable that a thermal expansion coefficient of the diffusion layer be larger than a thermal expansion coefficient of the first light collection layer and a thermal expansion coefficient of the second light collection layer.

According to another aspect of the present embodiment, an illuminating device is provided with: the optical member structured as described above; a chassis to which the optical member is fitted; and a direct light source accommodated in the chassis.

According to another aspect of the present embodiment, an illuminating device is provided with: the optical member structured as described above; a chassis to which the optical member is fitted; and an edge-light type light source and a light guide plate accommodated in the chassis.

According to another aspect of the present embodiment, a display device is provided with: the illuminating device structured as described above; and a display panel disposed to face the illuminating device.

According to the present embodiment, in the display device structured as described above, the display panel is a liquid crystal panel in which liquid crystal is sealed between a pair of substrates.

According to another aspect of the present embodiment, a television receiving device is provided with the display device structured as described above.

According to the present embodiment, the first projection portions of the first light collection layer and the second projection portions of the second light collection layer are disposed perpendicular to each other, and the first and second reflection portions are provided corresponding to the boundaries between adjacent first projection portions and between adjacent second projection portions. This makes it possible to collect, without waste, light entering the first and second light collection layers in the period directions of the first and second projection portions within a range of a predetermined view angle. Thus, effective use can be made of light emitted from the light source.

According to the present embodiment, the width of each second reflection portion in the period direction is smaller than the width of each first reflection portion in the period direction. This makes it possible to reduce light emitted from the second light collection layer at an excessively large exit angle, and also to reduce light whose intensity is reduced by being reflected from the second reflection layer back to the diffusion layer. As a result, the light amount at the front surface can be further increased.

According to the present embodiment, since the axis extending in the direction in which the first projection portions extend and the axis extending in the direction in which the second projection portions extend form an angle of 90°±1°, effective use can be more securely made of light emitted from the light source.

According to the present embodiment, the first reflection layer, the first light collection layer, the second reflection layer, and the second light collection layer are adhered to the plate-shaped diffusion layer. This helps prevent creases from occurring in the first reflection layer, the first light collection layer, the second reflection layer, and the second light collection layer due to, for example, heat from the light source.

According to the present embodiment, since the first and second projection portions are lenticular lenses or prisms, the first and second projection portions for collecting light within a predetermined view angle can be realized easily.

According to the present embodiment, since diffusion particles are dispersedly contained in the base material of the diffusion layer, the diffusion layer for diffusing light can be realized easily.

According to the present embodiment, the thermal expansion coefficient of the diffusion layer is larger than the thermal expansion coefficient of the first light collection layer and the thermal expansion coefficient of the second light collection layer. Thus, when the optical member, whose periphery is fixed, expands due to heat from the light source, the light-emission side center portion becomes concave. This makes it possible to prevent the display panel and the optical member from coming in contact with each other.

Figure 1:
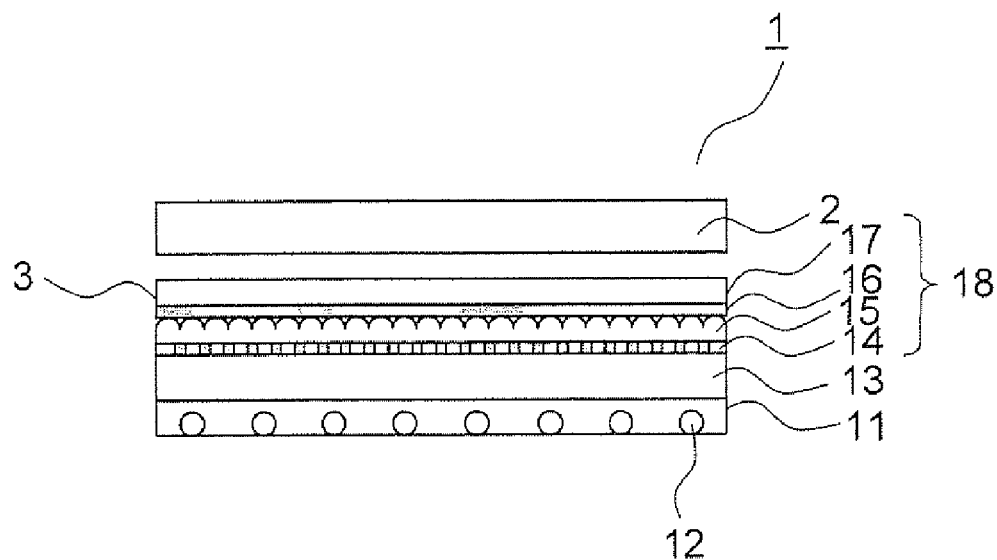
FIG. 1 is a side sectional view showing a display device of a first embodiment.

LIST OF REFERENCE SYMBOLS 1 display device
2 display panel
3 illuminating device
11 reflection plate
12 light source 13 diffusion plate
14 first reflection layer
14a first reflection portion
15, 25 first light collection layers
15a, 25a first projection portions
16 second reflection portion
16a second reflection portion
17, 27 second light collection layers
17a, 27a second projection portions
18 optical-sheet group

BEST MODE

Hereinafter, embodiments will be described with reference to the drawings. FIG. 1 is a side sectional view showing a display device of a first embodiment. In a display device 1, which is to be used in a television receiving device or as a display for a personal computer, an illuminating device 3 is oppositely disposed on the rear surface side of a display panel 2. The display panel 2 is, for example, a liquid crystal panel formed of a pair of substrates and liquid crystal sealed between the substrates. The display panel 2 has pixels arranged in a matrix. Light emitted from the illuminating device 3 passes through predetermined pixels in the display panel 2, and thereby an image is displayed.

The illuminating device 3 has a rear surface side thereof covered with a chassis (not shown). An optical member formed of a diffusion plate 13 and an optical-sheet group 18 is fitted to the chassis, and a light source 12 is accommodated in the chassis. The light source 12 is formed with a plurality of column-shaped fluorescent tubes arranged with a predetermined period. The light source 12 may be formed with a meandering fluorescent tube. A reflection plate 11 is disposed on a rear surface side of the light source 12, and reflects and guides light emitted from the light source 12 toward the display panel 2. The diffusion plate 13 (diffusion layer) is a plate-shaped translucent member made of a base material in which diffusion particles are dispersedly contained.

The optical-sheet group 18 is composed of a plurality of optical sheets adhered to the diffusion plate 13. On the diffusion plate 13, a first reflection layer 14, a first light collection layer 15, a second reflection layer 16, and a second light collection layer are provided in this order from the diffusion plate 13 side and adhered one on top of another with adhesion layers (not shown). Incidentally, the diffusion plate 13 and the optical-sheet group 18 form the optical member that receives light from the light source 12 and emits the light with a predetermined distribution of brightness.

Figure 2:
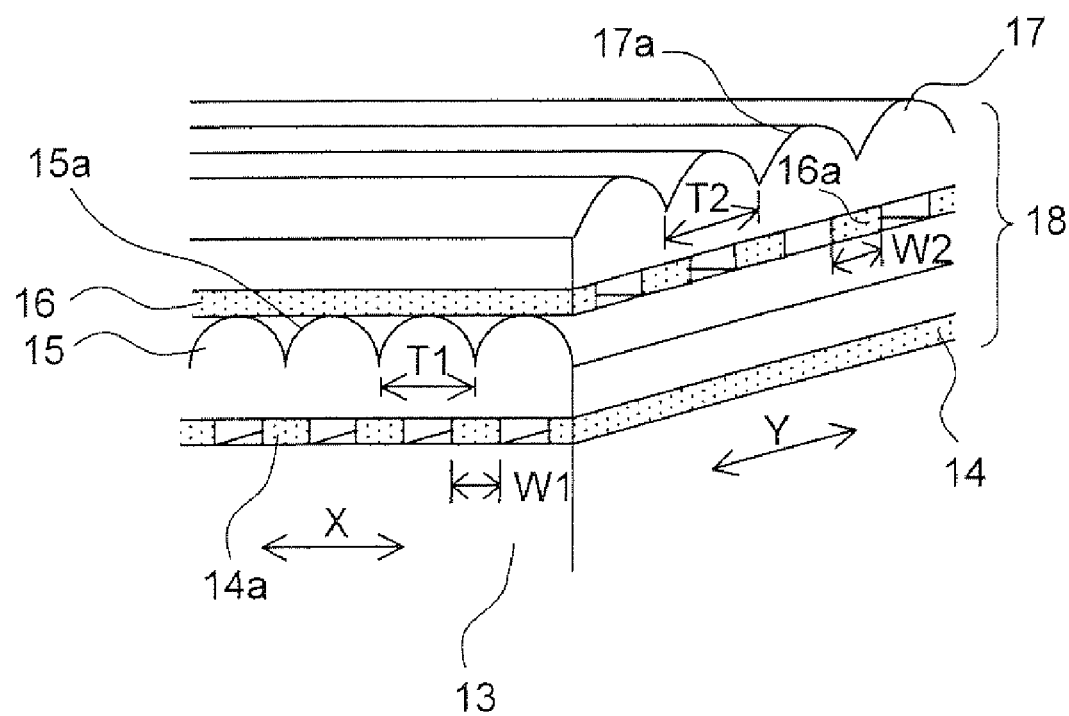
FIG. 2 is a perspective view showing an optical-sheet group of an illuminating device incorporated in the display device of the first embodiment.

FIG. 2 is a perspective view showing the optical-sheet group 18 in detail. In the first light collection layer 15, a plurality of first projection portions 15a are arranged in direction X with a predetermined period T1. The first projection portion 15a is a lenticular lens having a cylindrical surface extending in direction Y. That is, the first light collection layer 15 is a lenticular sheet formed of an array of lenticular lenses. Thus, light emitted and diffused in direction X from the diffusion plate 13 is, when it enters the first light collection layer 15, refracted at the cylindrical surfaces of the first projection portions 15a and is thereby collected.

The first reflection layer 14 is disposed between the diffusion plate 13 and the first light collection layer 15, and has a plurality of first reflection portions 14a that are arranged with a period T1 so as to face boundaries between adjacent first projection portions 15a. Light emitted from the diffusion plate 13 and approaches boundaries between adjacent first projection portions 15a is reflected by the first reflection portions 14a toward the diffusion plate 13. The thus reflected light is reflected on the reflection plate 11 (see FIG. 1) and enters the first light collection layer 15 from different positions.

Light traveling close to a boundary between adjacent first projection portions 15a to be reflected on cylindrical surfaces is emitted from positions opposite to the reflection positions, at which the light has been reflected, at large angles in direction X with respect to the normal line of the display panel 2. With the first reflection portions 14a, light that would otherwise travel close to boundaries between adjacent first projection portions 15a is reflected, and thereby light emitted at large angles in direction X can be reduced.

In the second light collection layer 17, a plurality of second projection portions 17a are arranged in direction Y with a predetermined period T2. The second projection portion 17a is a lenticular lens having a cylindrical surface extending in direction X. That is, the second light collection layer 17 is a lenticular sheet formed of an array of lenticular lenses. Thus, light emitted and diffused in direction Y from the diffusion plate 13 to travel via the first light collection layer 15 is, when it enters the second light collection layer 17, refracted at the cylindrical surfaces of the second projection portions 17a, and is thereby collected.

The second reflection layer 16 is disposed between the first light collection plate 15 and the second light collection layer 17, and has a plurality of second reflection portions 16a that are so arranged, with a period T2, as to face boundaries between adjacent second projection portions 17a. Light emitted from the first light collection layer 15 and approaches boundaries between adjacent second projection portions 17a is reflected by the second reflection portions 16a toward the diffusion plate 13. The thus reflected light is reflected by the reflection plate 11 (see FIG. 1) and enters the second light collection layer 17 from different positions.

Light traveling close to a boundary between adjacent second projection portions 17a to be reflected on the cylindrical surfaces is emitted from positions opposite to the reflection positions, at which it has been reflected, at large angles in direction Y with respect to the normal line of the display panel 2. Light traveling close to the boundaries between adjacent second projection portions 17a is reflected by the second reflection portions 16a, and thereby light emitted at a large angle in direction Y can be reduced.

The width W2 of each of the second reflection portions 16a is smaller than the width W1 of each of the first reflection portions 14a. As a result, a smaller amount of light is reflected by the second reflection layer 16 than by the first reflection layer 14.

In the display device 1 structured as described above, light emitted from the light source 12 toward the diffusion plate 13 enters the diffusion plate 13. Light emitted from the light source 12 in a direction away from the diffusion plate 13 is reflected by the reflection plate 11 to enter the diffusion plate 13.

Light incident on the diffusion plate 13 is diffused and the diffused light enters the first light collection layer 15. Part of the diffused light is reflected on the first reflection portions 14a of the first reflection layer 14, and, after being reflected on the reflection plate 11, enters the first light collection layer 15 from different positions. Light incident on the first light collection layer 15 is refracted at the cylindrical surfaces of the first projection portions 15a and emitted at such an exit angle in direction X that directs the light in a direction close to the direction of the normal line of the display panel 2.

Light emitted from the first light collection layer 15 enters the second light collection layer 17. Part of the light emitted from the first light collection layer 15 is reflected on the second reflection portions 16a of the second reflection layer 16, and, after being reflected on the reflection plate 11, enters the second light collection layer 17 from different positions. Light incident on the second light collection layer 17 is refracted at the cylindrical surfaces of the second projection portions 17a and emitted at such an exit angle in direction Y that directs the light in a direction close to the direction of the normal line of the display panel 2.

Figure 3:
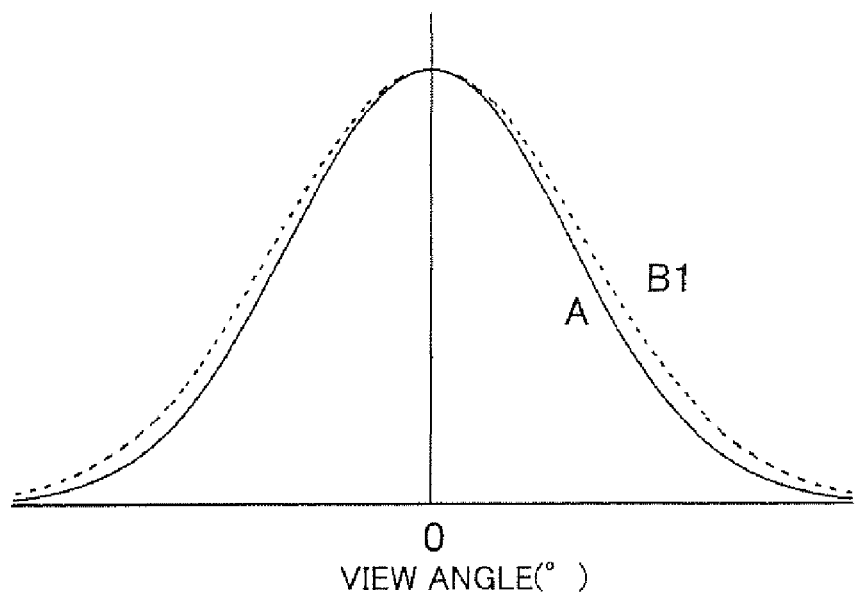
FIG. 3 is a diagram showing the distribution of brightness of the illuminating device incorporated in the display device of the first embodiment.

FIG. 3 shows distribution of brightness of light emitted from the illuminating device 3. The vertical axis indicates brightness, and the horizontal axis indicates the view angle in direction X (unit: °, indicated by the solid line A in the figure) and the view angle in direction Y (unit: °, indicated by the broken line B1 in the figure). According to the figure, light is collected in a range of predetermined view angle in directions X and Y. As a result, useless emission of light in a range out of the view angle is prevented, and this helps make effective use of light to increase the light amount at the front surface of the display panel 2.

The width W2 of the second reflection portion 16a is smaller than the width W1 of the first reflection portion 14a. As a result, brightness has a wider distribution in direction Y than in direction X, but light emitted in direction Y at an excessively large exit angle is reduced.

Light reflected on the second reflection layer 16 to return to the diffusion plate 13 is repeatedly reflected and refracted at the first light collection layer 15, the first reflection layer 14, the diffusion plate 13, and the reflection plate 11, and thereby the intensity of the light is greatly attenuated. Light that is reflected on the second reflection portion 16a to reach the first reflection portions 14a is reflected on the first reflection portions 14a. Part of the light thus reflected on the first reflection portions 14a enters the cylindrical surfaces of the first projection portions 15a at a large entrance angle to be emitted in direction X at an excessively large exit angle.

Part of light that approaches the boundaries between adjacent second projection portions 17a is emitted at a small exit angle. Thus, if the width W2 of the second reflection portion 16a is made larger, light emitted at a small exit angle is also reflected, and as a result, more light has its intensity attenuated and more light is reflected by the first projection portions 15a. This results in less light amount at the front surface of the display panel 2. Thus, by making the width W2 of the second reflection portion 16a small, it is possible to reflect light emitted at an excessively large exit angle in direction Y, and to increase the light amount at the front surface of the display panel 2 as well.

According to the this embodiment, the first projection portions 15a of the first light collection layer 15 and the second projection portions 17a of the second light collection layer 17 are disposed perpendicular to each other, and the first and second reflection portions 14a and 16a are provided for the boundaries between adjacent first projection portions 15a and between adjacent second projection portions 17a. This makes it possible to make a full use of light entering the first and second light collection layers 15 and 17, and to collect light in ranges of predetermined view angles in the period directions X and Y of the first and second projection portions 15a and 17a. Thus, effective use can be made of light emitted from the light source.

Incidentally, it is preferable that an axis extending in a direction in which the first projection portions 15a extend and an axis extending in a direction in which the second projection portions 17a extend form an angle of 90°±1°. This makes it possible to securely make effective use of light emitted from the light source 12.

Figure 4:
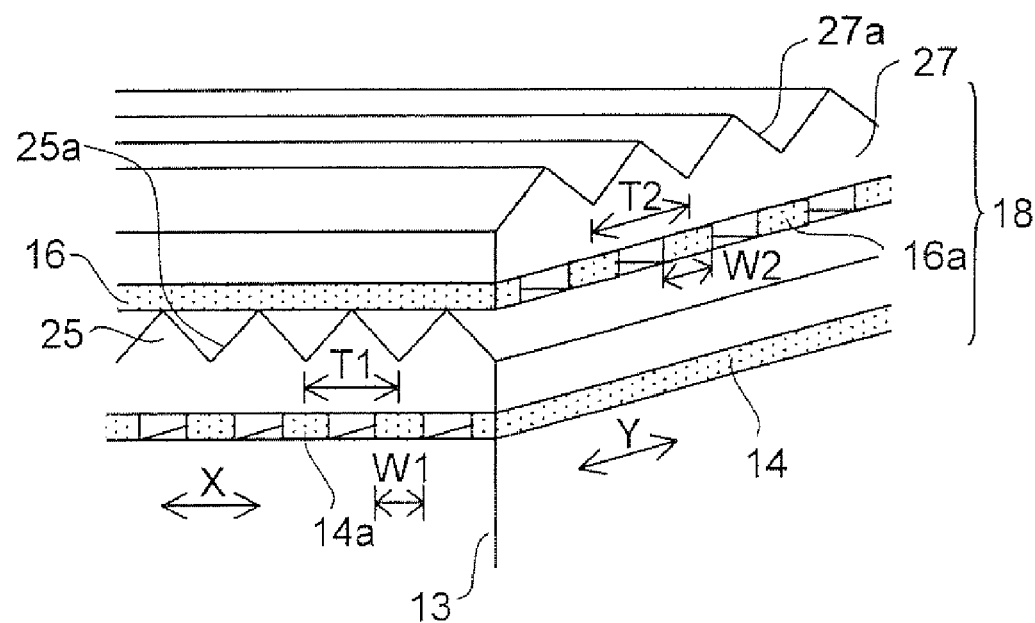
FIG. 4 is a perspective view showing an optical-sheet group of an illuminating device incorporated in a display device of a second embodiment.
Figure 5:
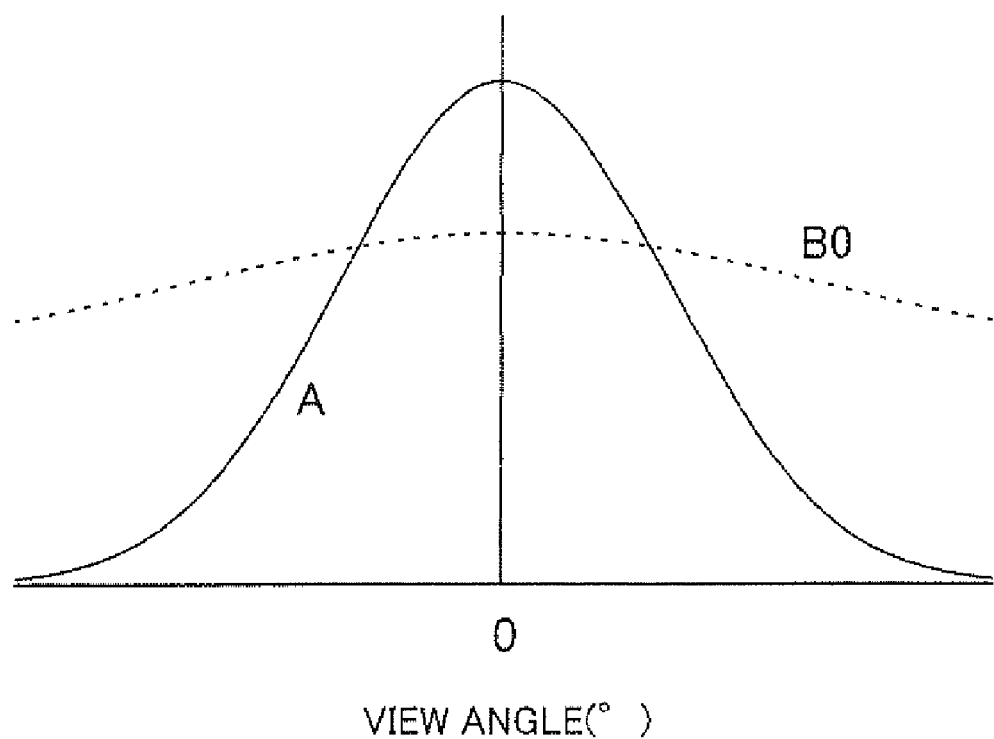
FIG. 5 is a diagram showing the distribution of brightness of an illumination device incorporated in a conventional display device.

Next, FIG. 4 is a side sectional view showing the optical-sheet group 18 of the illuminating device 3 incorporated in the display device 1 of the second embodiment. Fort the sake of convenience of description, such parts as find their counterparts in the first embodiment shown in the above referred-to FIGS. 1 to 3 are identified by common reference signs. In this embodiment, the first and second light collection layers 25 and 27 are prism sheets. Otherwise, this embodiment is the same as the first embodiment.

In the first light collection layer 25, a plurality of first projection portions 25a are arranged in direction X with a predetermined period T1. The first projection portions 25a are prisms extending in direction Y. Thus, light emitted and diffused in direction X from the diffusion plate 13 is, when it enters the first light collection layer 25, refracted at surfaces of the first projection portions 25a in a direction in which the light is collected.

In the second light collection layer 27, a plurality of second projection portions 27a are arranged in direction Y with a predetermined period T2. The second convex portions 27a are prisms extending in direction X. Thus, light emitted and diffused in direction Y from the diffusion plate 13 to travel via the first light collection layer 25 is, when it enters the second light collection layer 27, refracted at surfaces of the second projection portions 27a in a direction in which the light is collected. The width W2 of the second reflection portion 16a is smaller than the width W1 of the first reflection portion 14a.

Thus, in the same manner as in the first embodiment, the first projection portions 25a of the first light collection layer 25 and the second projection portions 27a of the second light collection layer 27 are disposed perpendicular to each other, and the first and second reflection portions 14a and 16a are provided individually corresponding to the boundaries between adjacent first projection portions 25a and between adjacent second convex portions 27a. This makes it possible to make full use of light entering the first and second light collection layers 25 and 27, and to collect the light in the ranges of predetermined view angles in the period direction X of the first projection portions 25a and the period direction Y of the second projection portions 27a. Thus, effective use can be made of light emitted from the light source 12.

Incidentally, it is preferable that an axis in a direction in which the first projection portions 25a extend and an axis in a direction in which the second projection portions 27a extend form an angle of 90°±1°.

In the first and second embodiments, the diffusion plate 13 is formed in a plate shape, but it may be formed in a sheet shape. However, it is more preferable that, as in the first and second embodiments, the first reflection layer 14, the first light collection layer 15 (25), the second reflection layer 16, and the second light collection layer 17(27) be adhered to the diffusion plate 13 formed in a plate shape. That is, by adhering the optical-sheet group 18 to the diffusion plate 13, creases can be prevented that may result from the optical-sheet group 18 expanding due to, for example, heat from the light source 12.

The first projection portions 15a (see FIG. 2) of the first embodiment formed as lenticular lenses and the second projection portions 27a (see FIG. 4) of the second embodiment formed as prisms may be disposed perpendicular to each other. The first projection portions 25a (see FIG. 4) of the second embodiment formed as lenticular lenses and the second projection portions 17a (see FIG. 2) of the first embodiment formed as prisms may be disposed perpendicular to each other.

It is preferable that the thermal expansion coefficient of the diffusion plate 13 be larger than the thermal expansion coefficients of the first and second light collection layers 15(25) and 17(27). That is, the optical member formed of the diffusion plate 13 and the optical-sheet group 18 is disposed facing the display panel 2 with its periphery fixed, and expands with heat generated by the light source 12. In this event, since the thermal expansion coefficient of the diffusion plate 13 is larger, the optical member warps such that the center portion thereof on the emission side is concave away from the display panel 2. Thus, contact between the display panel 2 and the optical member can be avoided, and thus degradation can be prevented from occurring in display quality and reliability due to mechanical stress applied to the display panel 2.

Incidentally, open slits formed by source and gate lines are provided in the display panel 2. This may cause an interference pattern to be generated between the display panel 2 and the first reflection layer 14. If the width W2 of the second reflection portions 16a or the width W1 of the first reflection portions 14a is changed, images of the first reflection portions 14a as seen from the display panel 2 side change. Thus, generation of an interference pattern can be prevented by making the widths W1 and W2 equal, or making one of the widths W1 and W2 larger than the other.

Here, the width W2 of the second reflection portions 16a may be larger than the width W1 of the first reflection portions 14a, but if the width W2 is made larger than the width W1, the light amount at the front surface of the display panel 2 can be increased as described above. If the width W2 of the second reflection portions 16a is made equal to the width W1 of the first reflection portions 14a, commonality of components can be achieved between the first and second reflection portions 14a and 16a.

In this embodiment, the description deals with the illuminating device 3 in which the direct type light source 12 is disposed on the rear surface side of the diffusion plate 13, but other structures may be adopted. That is, the illuminating device may be an illuminating device such that an edge-light type light source and a light guide plate are accommodated in a chassis.

The present technology is applicable to illuminating devices for illuminating display panels such as liquid crystal panels and to display devices using illuminating devices, such as television receiving devices and displays.

The invention claimed is:

1. An optical member, comprising:
    a diffusion layer diffusing light emitted from a light source;
    a first light collection layer that is disposed on a light-emission side of the diffusion layer, that has a plurality of first projection portions extending in a direction and arranged with a predetermined period, and that refracts and collects light incident thereon from the light diffusion layer by using the first projection portions;
    a first reflection layer that has a plurality of first reflection portions so arranged, with a same period as the first projection portions, as to face boundaries between adjacent first projection portions, that is disposed between the diffusion layer and the first light collection layer, and that reflects light emitted from the diffusion layer by using the first reflection portions;
    a second light collection layer that is disposed on a light-emission side of the first light collection layer, that has a plurality of second projection portions extending in a period direction of the first projection portions and arranged with a predetermined period, and that refracts and collects light incident thereon from the first light collection layer by using the second projection portions; and
    a second reflection layer that has a plurality of second reflection portions so arranged, with a same period as the second projection portions, as to face boundaries between adjacent second projection portions, that is disposed between the first light collection layer and the second light collection layer, and that reflects light emitted from the first light collection layer by using the second reflection portions, wherein
    a width of each of the second reflection portions in a period direction is smaller than a width of each of the first reflection portions in a period direction.

2. The optical member of claim 1, wherein
    an axis extending in a direction in which the first projection portions extend and an axis extending in a direction in which the second projection portions extend form an angle of $90°\pm1°$.

3. The optical member of claim 1, wherein
    the first reflection layer, the first light collection layer, the second reflection layer, and the second light collection layer are adhered to the diffusion layer formed in a plate shape.

4. The optical member of claim 1, wherein
    the first and second projection portions are lenticular lenses.

5. The optical member of claim 1, wherein
    the first and second projection portions are prisms.

6. The optical member of claim 1, wherein
    the first projection portions are lenticular lenses and the second projection portions are prisms.

7. The optical member of claim 1, wherein
    the first projection portions are prisms and the second projection portions are lenticular lenses.

8. The optical member of claim 1, wherein
    diffusion particles are dispersedly contained in a base material of the diffusion layer.

9. The optical member of claim 1, wherein
    a thermal expansion coefficient of the diffusion layer is larger than a thermal expansion coefficient of the first light collection layer and a thermal expansion coefficient of the second light collection layer.

10. An illuminating device, comprising:
    the optical member of claim 1;
    a chassis to which the optical member is fitted; and
    a surface light source composed of an edge-light type light source and a light guide plate accommodated in the chassis.

11. An illuminating device, comprising:
    the optical member of claim 1;
    a chassis to which the optical member is fitted; and
    a direct light source accommodated in the chassis.

12. A display device comprising:
    the illuminating device of claim 11, and a display panel disposed to face the illuminating device.

13. The display device of claim 12, wherein
    the display panel is a liquid crystal panel in which liquid crystal is sealed between a pair of substrates.

14. A television receiving device, comprising:
    the display device of claim 12.

* * * * *